Wm. Wright. Impt in Steam Pumps.
No. 100702
Fig. 1.
Fig. 2.
Fig. 3.
Fig. 4.
PATENTED MAR. 8 1870.
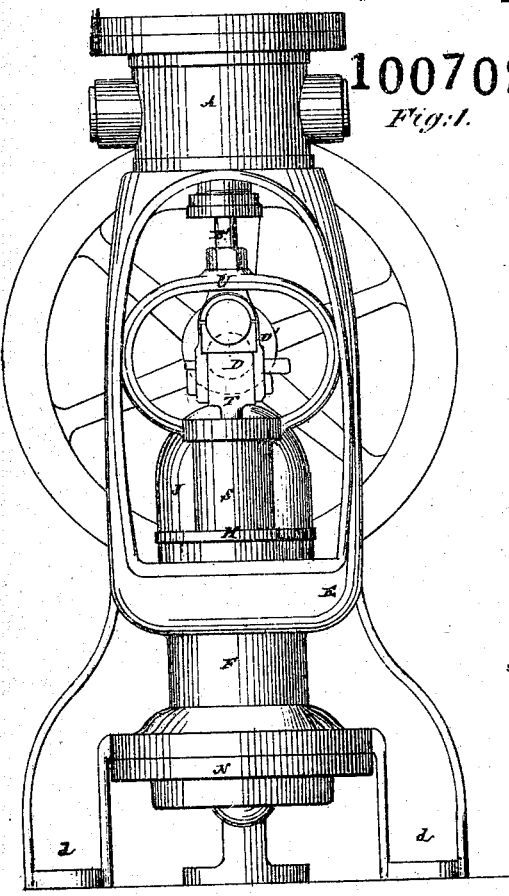
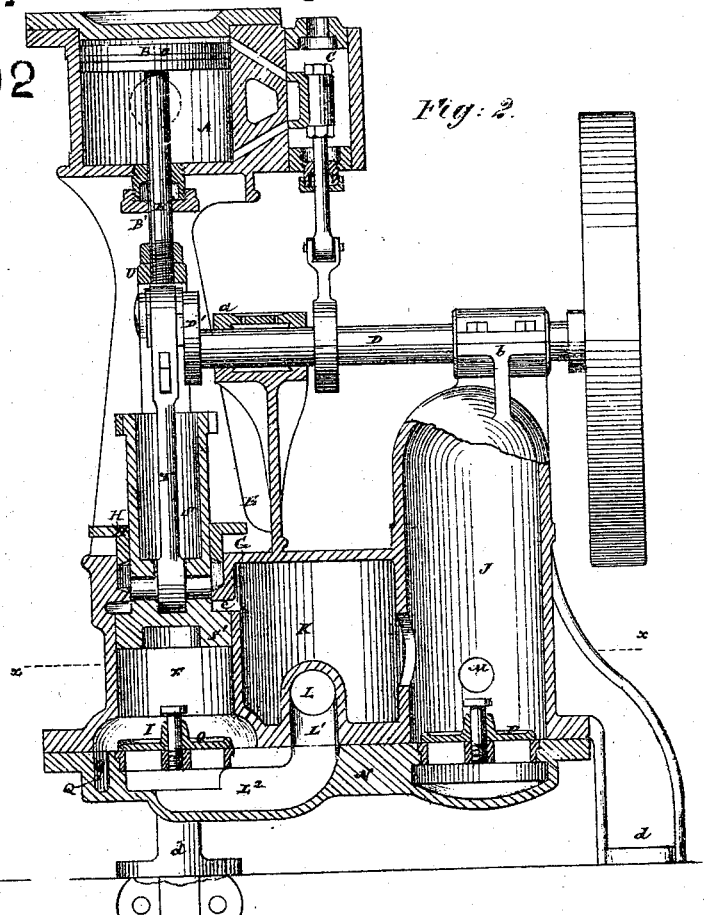
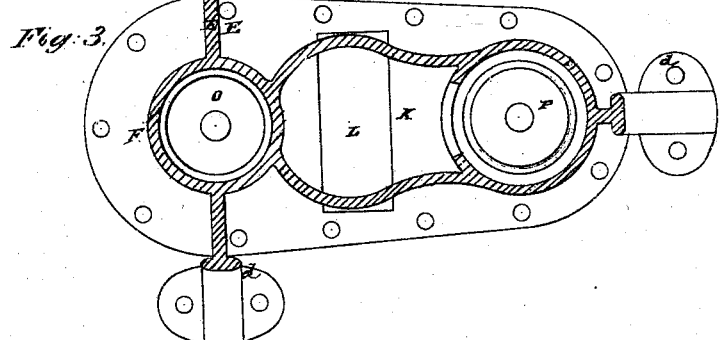
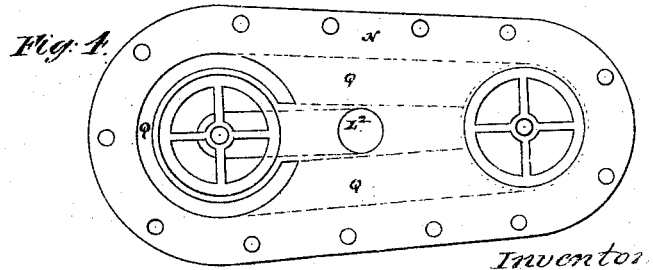
Witnesses;
Fredk Haynes
R. R. Rabeau
Inventor
Wm Wright

United States Patent Office.

WILLIAM WRIGHT, OF NEW YORK, N. Y.

Letters Patent No. 100,702, dated March 8, 1870.

IMPROVEMENT IN PUMPS.

The Schedule referred to in these Letters Patent and making part of the same.

To all whom it may concern:

Be it known that I, WILLIAM WRIGHT, of the city, county, and State of New York, have invented a new and useful Improvement in Steam-Pumps, of which the following is a full, clear, and exact description, reference being had to the accompanying drawing forming part of this specification, and in which—

Figure 1 represents a front end elevation of a steam-pump constructed in accordance with my improvement;

Figure 2, a sectional elevation taken centrally through the pump, at right angles to fig. 1;

Figure 3, a horizontal section taken as indicated by the line $x\ x$ in fig. 2; and Figure 4, a plan of a base-plate, which carries the induction and eduction-valves, and has arranged within it suitable water passages or connections.

Similar letters of reference indicate corresponding parts.

My improvement relates to steam-pumps in which the pump-piston is both bucket and plunger, but instead of causing the water to be passed through the bucket, as heretofore, which causes considerable friction, owing to the limited valve-room or space that is attainable, my invention provides for the discharge of the water backward through the bottom of the pump, by a channel-way or ways, whereby more room is secured for the induction and eduction-valves.

Also, the invention includes a novel arrangement, in the one casting, of certain main parts, whereby the cost and labor of fitting is reduced and a more steady or solid action is secured for the pump.

Likewise the invention embraces a certain combination of a detachable lower plate carrying the pump valves, with the induction and eduction-channels arranged in the fixed portion of the main frame.

Also, a novel and advantageous arrangement of a trunk-plunger, a pitman vibrating therein, and a yoke connecting the pump-plunger with the rod of the steam-piston.

Referring to the accompanying drawing—

A is the steam-cylinder arranged above;

B, its piston; and

C, the steam-chest, containing the valve, which is operated by an eccentric on the main or crank-shaft D.

E is the vertical frame for carrying the several parts, including the journal-box $a$ for the crank-shaft.

This frame also has cast with it in one piece the steam-cylinder A, the pump-barrel F, the stuffing-box G for the gland H, and the induction-valve chamber I, all in the same line or plane, and has, furthermore, cast on or with it the air-chamber J, carrying a second crank-shaft bearing, $b$, and a chamber, K, that serves to firmly connect the air-chamber with the frame, and the interior of which is in connection with the air-chamber and with the pump-barrel, at its top, through a space or channel, $c$, arranged between the pump-barrel and its stuffing-box.

Said frame also has cast in it the suction-channel L, that communicates with a branch-opening, L', in the base of the frame, and is left open at either end, for reception of the suction-pipe or pipes, and the air-chamber J is similarly provided with discharge-nozzles M on either or opposite sides of it.

This arrangement of and casting all in one piece with the frame E, of which they may be said to form part, the steam-cylinder with its attachments, the pump-barrel and stuffing-box, the induction-valve chamber and suction-channels, together with the air-chamber and bearing or bearings to the crank-shaft, add materially to the solid working of the pump, and largely reduce the cost and labor of fitting.

The bottom of said frame, taken as a whole, or the lower face of the same above leg-extensions $d$ thereto, is fitted to receive a plate, N, which carries on its upper face the induction-valve O and seat thereto; also the discharge-valve P and its seat likewise is provided with a channel, $L^2$, to connect the suction-channel L through the opening $L^1$ with the space below the induction-valve O, and another channel or channels, Q, arranged to connect the induction-valve-chamber I, above the induction-valve and outside of or around the suction-channel $L^2$, with the space below the discharge-valve P.

This plate N is secured by flange and bolts to the lower face of the main frame, above and inside of the leg-extensions $d$, which latter should project a sufficient distance below the bottom of the valve-plate N to allow of the same being taken off and removed without disturbing other parts of the machine.

It is preferred to use only a single induction-valve and single eduction or discharge-valve; but, of course, the same may be in pairs or sets.

This arrangement of the induction and eduction-valves in or on the removable plate N, taken in connection with the arrangement of the induction and discharge-pipes or outlets in the fixed portion of the frame, provides for repair or adjustment of the valves without disturbing the suction or discharge-pipes at their joints, and without interfering with the working connections generally.

The plunger of the pump is a trunk-piston, and is so constructed as that the area of the trunk-portion S, in its whole or outside diameter, is one-half the area of its piston-portion S'.

The pitman T, which is connected with the crank D' to give motion to the shaft D, is pivoted to the plunger at or near its bottom, and the rod B' of the steam-piston B connected with the pump-plunger by a yoke or frame, U.

By this arrangement of the pitman T within the trunk, and connection of the latter with the steam-piston by the yoke U, space is economized. The trunk also dispenses with the necessity of independent slides or guides, and a direct action is secured from the steam-piston to the pump-plunger.

The operation is as follows:

Supposing the pump to be in working order, and the several channels or passages to be full of water, and the pump-plunger to have made its upward stroke, water will have been caused to enter through the induction-valve O, and made to fill the pump-barrel below the piston-portion S' of the plunger, that in such upward stroke will have displaced the water previously contained in the pump-barrel around the trunk-portion S of the plunger, and which is only equal to one-half of the quantity of water drawn in through the induction-valve O.

The water thus displaced by the upper annular face of the plunger escapes by the passage c back into the chamber K, and from thence into the air-chamber J, and out through the discharge-nozzle or nozzles M.

In the return or down stroke of the pump-plunger the water previously drawn into the pump-barrel below the plunger is discharged, through the channel or channels Q and through the discharge-valve P, into the air-chamber, which water serves—that is, one-half of it—to keep up the supply above the upper or annular portion of the plunger in the descent of the latter, and the other half to maintain the discharge through the nozzle or nozzles M.

In such operation, while the pump only draws water in its upward stroke, it discharges during both strokes, each discharge being equal to half the quantity drawn in, the same being effected with only one induction-valve or set of induction-valves and one eduction-valve or set of eduction-valves, such valves opening but once during each up-and-down movement of the plunger combined.

In one sense the discharge, though kept up during both strokes, is wholly maintained by the down-stroke of the plunger, as the water is all drawn in below the plunger in its ascent, and in the descent of the latter is all discharged or driven back through the bottom of the pump or channel-way or ways Q.

By this arrangement a much larger amount of space is secured alike for the induction and eduction-valve or valves than where the water is passed through the bucket, and hence a greater working economy ensues.

What is here claimed, and desired to be secured by Letters Patent, is—

1. The pump-barrel F, in open communication, at or near its top, with the air-chamber J above the discharge-valve P, and in communication below, by a channel or passage, with the under side of said valve, in combination with the trunk-piston or bucket-plunger S S' and induction-valve O, to the inlet-passage of the pump, substantially as specified.

2. The removable valve-plate N, with its induction and eduction-valves O and P, inlet-passage $L^2$, and outlet Q, in combination with the induction-channel or passage L and eduction-nozzle or nozzles M, arranged above in a fixed portion of the main frame, essentially as described.

3. The combination and arrangement of the main frame, of the steam-cylinder A with its attachments, the pump-barrel F with its stuffing-box G, the valve-chamber I, the air-chamber J with its connecting-chamber K and induction-passage L, and the bearings $a$ $b$ to the crank-shaft D, substantially as specified.

4. The combination of the yoke U with the piston-rod B' and trunk S of the pump-plunger, the gland H, and the pitman T, together with the crank D', substantially as shown and described.

WM. WRIGHT.

Witnesses:
FRED. HAYNES,
R. E. RABEAU.